No. 878,574. PATENTED FEB. 11, 1908.
H. H. STEELE.
TYPE WRITING MACHINE.
APPLICATION FILED SEPT. 1, 1906.
5 SHEETS—SHEET 1.

Fig. 1.

WITNESSES:
INVENTOR.
BY
ATTORNEY.

No. 878,574. PATENTED FEB. 11, 1908.
H. H. STEELE.
TYPE WRITING MACHINE.
APPLICATION FILED SEPT. 1, 1906.

WITNESSES:
M. F. Hansmicher
E. M. Wells

INVENTOR.
Herbert H. Steele
BY Jacob Felbel
ATTORNEY.

No. 878,574. PATENTED FEB. 11, 1908.
H. H. STEELE.
TYPE WRITING MACHINE.
APPLICATION FILED SEPT. 1, 1906.
5 SHEETS—SHEET 4.

WITNESSES:

INVENTOR.
Herbert H. Steele
BY
ATTORNEY.

No. 878,574.

H. H. STEELE.
TYPE WRITING MACHINE.
APPLICATION FILED SEPT. 1, 1906.

PATENTED FEB. 11, 1908.

UNITED STATES PATENT OFFICE.

HERBERT H. STEELE, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 878,574.  Specification of Letters Patent.  Patented Feb. 11, 1908.

Application filed September 1, 1906. Serial No. 332,951.

*To all whom it may concern:*

Be it known that I, HERBERT H. STEELE, citizen of the United States, and resident of Syracuse, in the county of Onondaga and State of New York, have invented certain new and useful Improvements in Type-Writing Machines, of which the following is a specification.

My invention relates to ribbon mechanism for typewriting machines and its object, generally stated, is to provide means for changing or shifting automatically at a predetermined point or points in the line of writing from one field to another of a ribbon having a plurality of fields of different characteristics.

Another object of my invention is to provide means to enable a ribbon having fields of different characteristics to be automatically changed or shifted so that during the time the carriage is passing through a predetermined columnar field a new ribbon field or stripe will be rendered operative, and then after the carriage has passed said predetermined columnar field to be automatically shifted back to render the original ribbon field again operative.

To the above and other ends the invention consists in the features of construction, combinations of devices and arrangements of parts, hereinafter fully described and particularly pointed out in the claims.

Generic claims directed to means for accomplishing the general object above stated will be found in my application filed September 1st, 1906, Serial No. 332,949. In the present instance I accomplish the results sought by providing two or more coöperating shifting members, one or more on the traveling element or carriage of the machine and one on a fixed part thereof, said members being relatively adjustable so that they may co-act at varying predetermined points in the carriage travel. When two of said members co-act the ribbon mechanism is automatically changed or shifted to present, when the types are actuated, a different field or portion of the width of the ribbon to the action of the types and the new ribbon field remains operative as long as the two ribbon shifting members continue in co-action. The construction is such that as soon as said co-acting members disengage, the ribbon mechanism is automatically changed back or re-shifted to render the first ribbon field again operative.

It will be understood that by my present construction the ribbon fields may be shifted and re-shifted a plurality of times during the travel of the carriage in one direction. During the return movements of the carriage no change or shift of the ribbon fields takes place.

My present invention is preferably employed in connection with tabulating devices so that if a two-color ribbon be used the characters in one or more columns on the work sheet may be written in one color while the characters in one or more other columns variously disposed may be written in another color.

I have shown my invention as applied to a Monarch front strike typewriting machine, which machine employs a vibratory ribbon carrier, but it is to be understood that said invention may be adapted to other forms of writing machines.

In the accompanying drawings.

Figure 1:
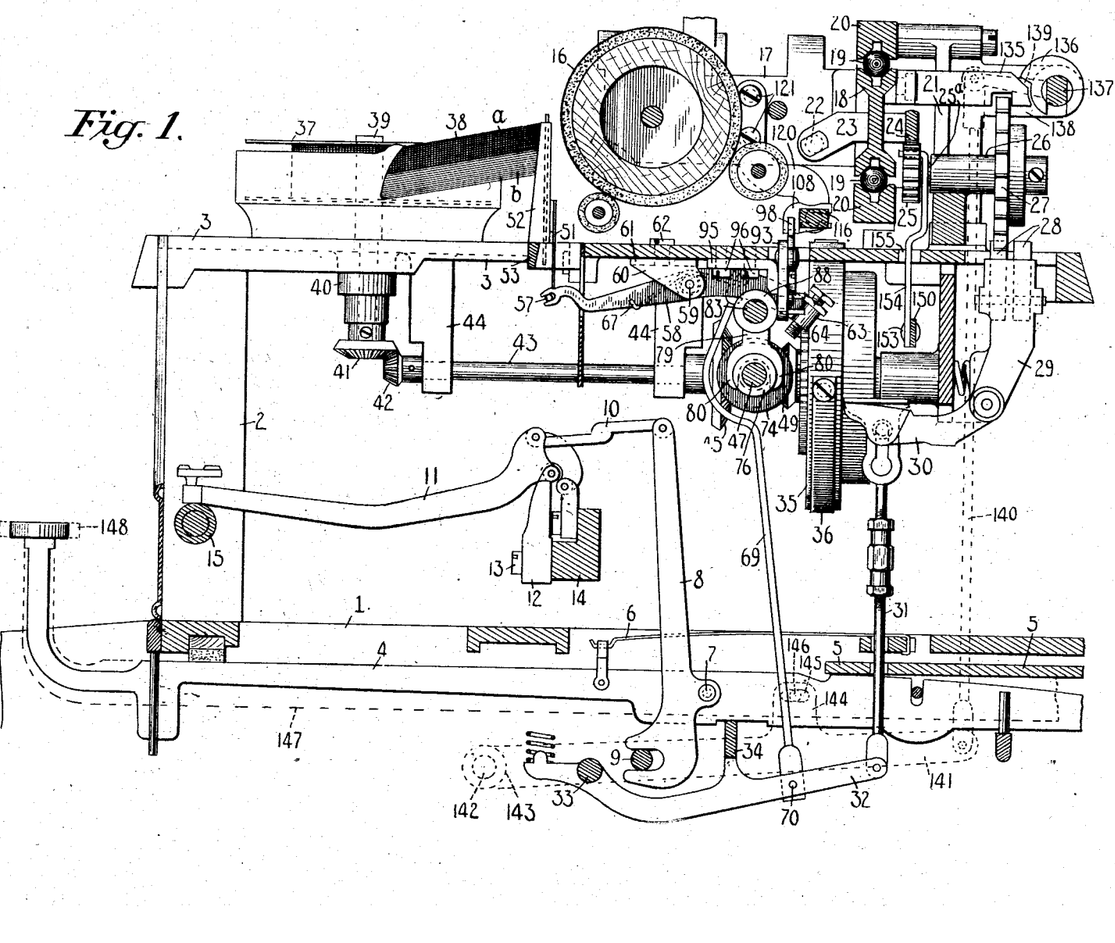
Figure 1 is a full-sized longitudinal, vertical sectional view of a typewriting machine embodying my invention, parts of the machine being omitted and parts being broken away, the section being taken on the line w—w of Fig. 2 and looking in the direction of the arrow at said line.
Figures 2, 3, 4:
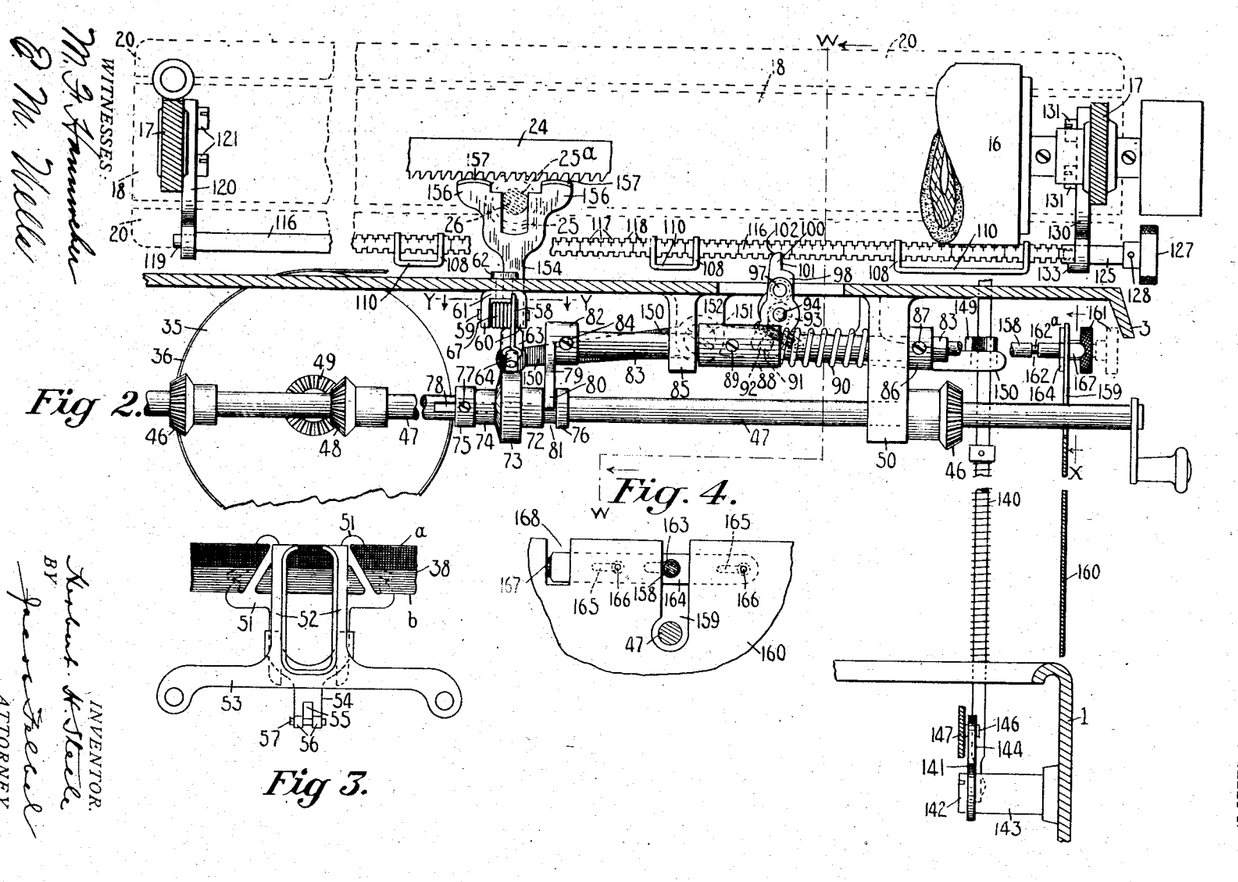
Fig. 2 is a full-sized fragmentary transverse sectional view taken on a plane forward of the platen.
Fig. 3 is a full-sized front elevation of the vibratory ribbon carrier and the bracket on which said carrier is supported, a part of the ribbon being shown.
Fig. 4 is a fragmentary sectional view, taken on a plane represented by the line x in Fig. 2 and looking in the direction of the arrows at said line.

Referring first to Figs. 1 and 2, the main frame of the machine comprises a base 1, corner posts 2 (of which one only is shown) and a top plate 3 supported by said posts. Key levers 4 are fulcrumed on a fulcrum plate 5 mounted in the rear of the base, each of said key levers being provided with a restoring spring 6. Pivoted at 7 to each key lever is a sub-lever 8 slotted at its lower end portion to coöperate with a fixed abutment 9 supported at the sides of the base. The upper end of each sub-lever is connected by a link 10 with a type bar 11, said type bar being pivotally mounted in a hanger 12 secured by a screw 13 to a segmental hanger support 14. The hangers are arranged in arcs of circles on the support and the free ends of the type bars 11 are normally supported on a type rest 15, said type bars when actuated coöperating with the front face of a rotary platen 16 mounted in a U-shaped platen frame or carriage composed of side bars 17 and a rear bar 18 connecting said side bars. The rear bar 18 is provided at its top and bottom with oppositely disposed longitudinal grooves which coöperate with anti-friction balls 19, said balls also coöperating with fixed grooved rails 20 secured to standards 21 rising from the top plate 3. Pivoted at 22 in the side bars of the carriage are horizontally disposed and rearwardly projecting arms 23, said arms supporting at their rear ends a carriage rack 24 which normally meshes with a feed pinion 25 secured to a shaft 25$^a$ journaled on a bracket 26 rising from the top plate. A toothed escapement wheel 27 is operatively connected with said shaft 25$^a$, and coöperative with said escapement wheel are escapement dogs 28 mounted at the top of a vibratory carrier or rocker 29. The dog rocker 29 is provided with a horizontally disposed and forwardly projecting arm 30 which is connected by a link 31 with a central rearwardly extending arm 32 of the universal bar frame, said frame comprising a rock shaft 33 journaled at the sides of the base and a universal bar proper 34 extending from side to side of the machine beneath the series of key levers 4. The universal bar is adapted to be operated by any of the key levers, thereby causing the dog carrier to be vibrated and the dogs 28 to coöperate in a known manner with the escapement wheel 27 to permit the carriage to be drawn a letter space distance at a time leftward across the top plate under the influence of a spring drum 35 with which said carriage is connected by a band or strap 36.

Ribbon spools 37 (only one of which is shown in the drawings) are arranged above the top plate, one at each side of the machine and forward of the platen. A ribbon 38 is wound upon the ribbon spools, said ribbon as herein shown being divided longitudinally into fields a and b of different characteristics; that is to say, the field a may be one color such as black and the field b of a different color such as red, or the field a may be copying ribbon and the field b record ribbon, for example. The ribbon 38 may be fed longitudinally from one spool to the other by any suitable means, that shown in the drawings being substantially the same as that employed in the Monarch machine. Each ribbon spool 37 is carried by an upright shaft 39 (Fig. 1) which rotates in a fixed bearing 40 and has secured to its lower end a small beveled gear 41. The gear 41 meshes with the beveled pinion 42 secured to the forward end of a horizontal shaft 43, said shaft being supported in lugs 44 depending from the top plate and carrying at its rear end a beveled pinion 45, said pinion 45 being adapted to mesh with a beveled driving pinion 46 mounted on a driving or power shaft 47. Rotary movement is transmitted to the shaft 47 by beveled pinions 48 and 49, the pinion 48 being operatively connected with the driving shaft and the pinion 49 with the spring drum 35. It will be understood that both ribbon spools are provided with like gear trains which are adapted to be actuated by the driving pinions 46 on the shaft 47. The driving shaft 47 is journaled in lugs 50 depending from the under side of the top plate and is capable of both rotary and longitudinal movement in its bearings, the longitudinal position of said driving shaft determining which driving pinion 46 will be in mesh with its coöperating pinion 45 and which ribbon spool will be turned to wind the ribbon thereon.

Figures 11, 12, 13, 14:
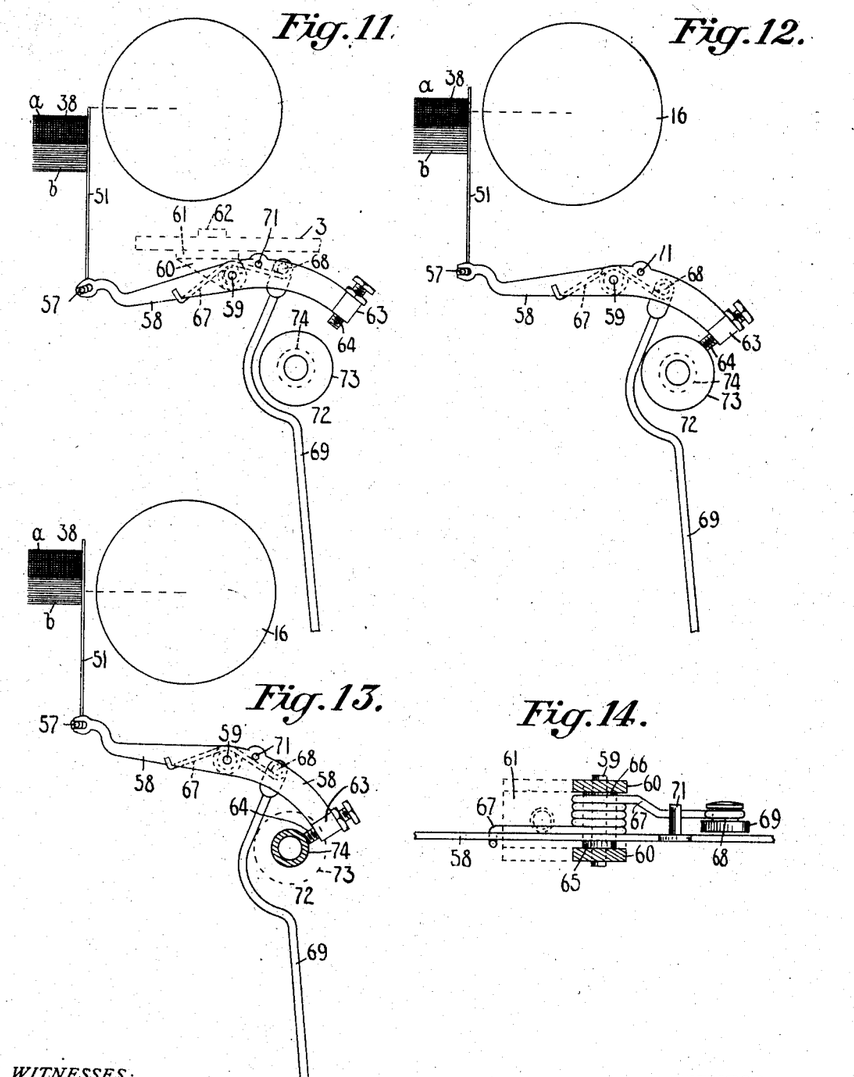
Figs. 11, 12 and 13 are diagrammatic views illustrating various positions of the vibratory ribbon carrier and its operating devices.
Fig. 14 is an enlarged fragmentary sectional view taken on a plane represented by the line y—y in Fig. 2 and looking in the direction of the arrows at said line, said Fig. 14 showing the lever for operating the vibratory ribbon carrier, part of the supporting bracket in which said lever is mounted and the upper end of the link which actuates said lever.

Midway between the ribbon spools the ribbon 38, as best shown in Figs. 1 and 3, is threaded through a vibratory ribbon carrier or vibrator 51, said vibrator being guided and supported in the upright arms 52 of a guide bracket 53, the latter being suitably secured to the top plate of the machine. The stem 54 of the carrier or vibrator is slotted as shown at 55 to form arms 56 which carry a cross pin 57, said cross pin being engaged by the slotted forward end of an operating member or lever 58 which has a pivot or fulcrum pin 59 journaled in the arms 60 of a U-shaped bracket 61 depending from the underside of the top plate and fixedly secured thereto by a headed screw 62 (Figs. 2 and 14). The free end of the forward arm of the operating lever is pivotally connected with the vibrator and the free end of the rear arm is curled or turned back on itself, as indicated at 63, to provide an opening the interior of which is threaded and receives an adjustable screw stop 64 which during the operation of the machine coöperates with a stop member presently to be described to effect a positive stoppage of the operating lever 58.

As best shown in Fig. 14 limiting collars or sleeves 65 and 66 surround the pivot pin 59 of the operating lever between the arms 60 of the supporting bracket and serve to prevent lateral movement of said lever towards one or another of the arms 60. The collar 65 is comparatively narrow and the collar 66 comparatively wide, the latter being at the left of the operating lever and serving to maintain it at considerable distance from the left hand arm 60. Coiled around the collar 66 is a wire spring 67, the forward end of which is hooked around the lower edge of the operating lever between the pivot of the latter and the vibrator. The rear end of the spring is coiled around a headed pin or stud 68 extending laterally from the upper end portion of a connecting link 69, the lower end of the latter being pivotally connected at 70 with the arm 32 of the universal bar frame, thus providing a yielding or a spring connection between said frame and the operating lever. A pin 71 projects laterally leftward from the rear arm of the operating lever, said pin coöperating with the rear portion of the spring 67 to prevent the latter from uncoiling and to limit the upward movement of the link 69 under the influence of said spring 67. The construction is such that when the key lever or spacing levers are operated the link 69 will be drawn downward and through the spring 67 will swing the operating lever 58 on its pivots, thereby actuating the ribbon vibrator. The normal position of the latter is such that, as shown in Figs. 1 and 11, it normally maintains the ribbon below the printing point, but when the operating lever is actuated the vibrator will be thrown upward to interpose the ribbon in the path of the type.

Figure 5:
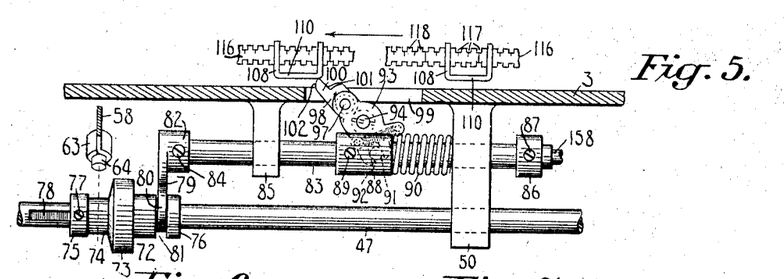
Fig. 5 is a view corresponding with Fig. 2 but with some of the parts shown in said Fig. 2 omitted and other of the parts shown in different relations from those in which they appear in said Fig. 2.

When a ribbon, such as that shown in the drawings, having longitudinal fields or stripes of different characteristics or colors is made use of in a machine having a vibratory ribbon carrier, it is necessary to vary the limit of upward movement of the carrier or vibrator or movement towards the printing point in order to move one field or another of the ribbon to the printing point and into the path of the types. In the construction shown I effect this result by providing a stop member adjustable to coöperate with the stop 64 to arrest the operating lever 58 at different points in its travel. It will be apparent, however, that this is only one way of effecting the change or shifting the ribbon field and that various other ways of accomplishing this result may be used within the scope of my invention. The stop member or ribbon-field-changer herein illustrated is designated as a whole by the numeral 72 and is clearly shown in Figs. 2 and 5. Said stop member is slidably mounted on the ribbon driving shaft 47 and comprises a cylindrical stopping portion 73, a cylindrical stopping portion 74 of less diameter, a hub portion 75 and a second hub portion 76 at the right of the cylindrical stopping portion 73. The hub portion 75 receives a screw 77, the inner end whereof engages in a slot 78 formed longitudinally of the driving shaft 47, the construction being such that the stop member 72 may be moved lengthwise or slid to and fro on the driving shaft 47 but is caused to turn with said shaft when the latter is rotated. It will be apparent that by moving the stop member 72 lengthwise of the driving shaft one or another of the stopping portions 73 and 74 will be brought into position to coöperate with the screw stop 64 when the operating lever is actuated by any of the key levers. The parts are so proportioned that when the operating lever is arrested by the stopping portion 73 the ribbon will have been lifted far enough to bring its top field or stripe a to the printing point only. If the stopping portion 74 is in operative position the ribbon will be lifted still higher before the operating lever is arrested, thereby bringing the lower field or stripe b to the printing point.

Figure 6:
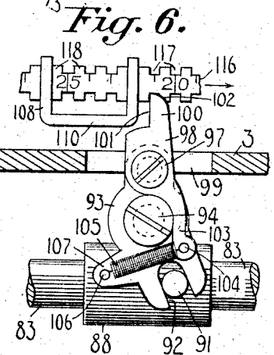
Figs. 6 and 7 are enlarged detail views of the coöperating ribbon shifting members as seen from the rear, said members being shown in different relations in the two figures.
Figure 7:
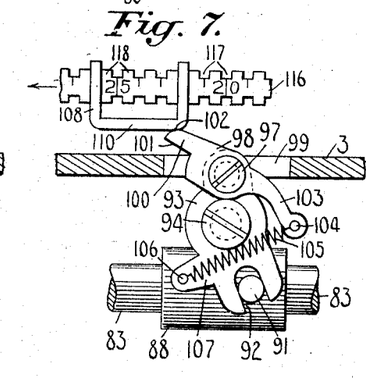
Figures 8, 9, 10:
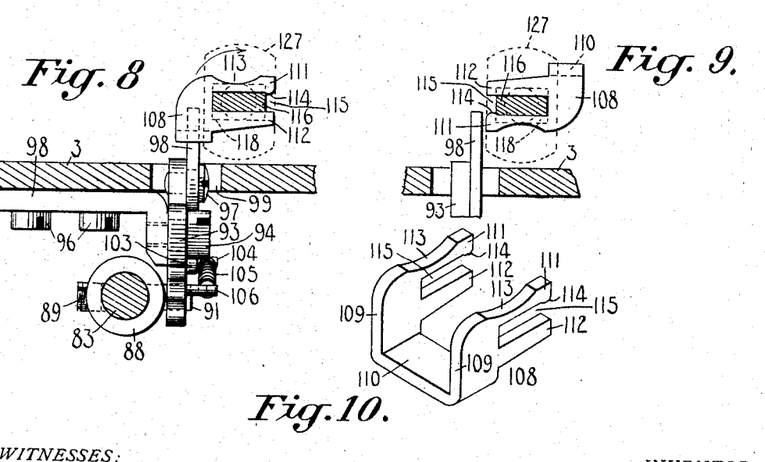
Fig. 8 is a sectional view showing the parts in Fig. 6 as they appear when viewed from the left hand side.
Fig. 9 is a view corresponding with Fig. 8, some of the parts shown in said Fig. 8 being omitted and other parts being shown in different relations from those in which they appear in said Fig. 8.
Fig. 10 is an enlarged perspective view of one of the ribbon-shifting members carried by the carriage.

I provide means for automatically sliding the stop member 72 to and fro on the driving shaft, said means acting at predetermined points in the carriage travel and effecting an automatic change or shift in the ribbon field at said predetermined points. In the present instance the automatic shifting means comprises a vertically disposed arm 79, the lower end whereof is bifurcated, the arms 80 of the bifurcation engaging in a circumferential groove or depression 81 formed in the hub portion 76 of the stop member 72, as shown in Figs. 1, 2 and 6. The upper end of the arm 79 is formed with a collar 82 perforated to receive the inner end of a spring-pressed slide rod 83 and being fixedly secured to said slide rod by a set screw 84. The slide rod 83 has its bearings in the right-hand lug 50 of the pair of lugs in which the driving shaft 47 is journaled and in a smaller lug 85 depending from the under side of the top plate at the left of the right hand lug 50. A collar 86 is secured to the slide rod near its right hand end by a set screw 87 and a somewhat longer collar 88 is secured to the slide rod by a set screw 89 between the two bearing lugs 50 and 85. An expansion spring 90 is coiled around the slide rod 83 between the collar 88 and the right hand lug 50, said spring tending constantly to press the slide rod longitudinally leftward in its bearings. Normally the spring maintains the collar 86 in engagement with the outer or right hand face of the lug 50, as shown in Fig. 2. The parts are so proportioned that normally the arm 79 at the opposite end of the slide rod is thereby positioned to maintain the stopping face 73 of the member 72 in operative position. Projecting from the rear of the collar 88 is a pin or stud 91, said stud being normally horizontal and engaging with a slot 92 formed in the lower end portion of one arm of a shifting lever 93 fulcrumed on a headed shouldered screw 94, said screw being supported in a right angle bracket 95 fixed to the under side of the top plate by screws 96 as shown in Figs. 1 and 8. Pivoted on a shouldered screw 97 which is supported in the lever 93 above the fulcrum 94 of the lever is a trip lever 98 which extends upwardly through an opening 99 in the top plate 3 and terminates in a lug 100 having a straight working face 101 and a curved face 102, the details of the lever 98 being best shown in Figs. 6 and 7. The lower arm or tail 103 of the lever 98 is provided with a rearwardly extending pin 104 on which is fastened one end of a coiled spring 105, the opposite end of said spring being secured to a pin 106 projecting rearwardly from an extension 107 on the lower arm of the lever 93.

The spring 105 serves normally to maintain the arm 103 of the lever 98 in contact with the head of the screw 94 on which the lever 93 is fulcrumed, the normal relation of the two levers 93 and 98 being best shown in Fig. 6. As will be more clearly understood from what follows, said lever 98 turns together with the lever 93 on which it is mounted to effect a shift of the ribbon mechanism when the carriage moves in one direction, but on the return movement of the carriage said lever 98 is adapted to be tripped or moved relatively to the lever 93 so as to yield and permit the unobstructed return of the carriage without affecting the ribbon. The two levers 93 and 98 constitute a two-part shifting device or member supported on a fixed part and coöperative with one or more shifting or contact members carried by the carriage to actuate the spring-pressed slide rod 83, and thereby automatically position the stop member or field-changer 72. In the present instance the shifting or contact members on the carriage are preferably in the form shown most clearly in Fig. 10 and designated as a whole by the numeral 108. The members 108, one or more of which may be employed, are formed of a single piece of sheet metal and comprise side arms 109 and a connecting bottom portion 110, the member being substantially U-shaped. Prongs or fingers 111 and 112 project horizontally and rearwardly from the side arms 109, the fingers 111 being above their companion fingers 112 and being cut away as indicated at 113 to enable said fingers 111 to yield or give slightly. The free lower end of each finger 111 terminates in a projecting rounded portion 114. Between each pair of arms 111 and 112 is a slot or opening 115.

Figure 15:
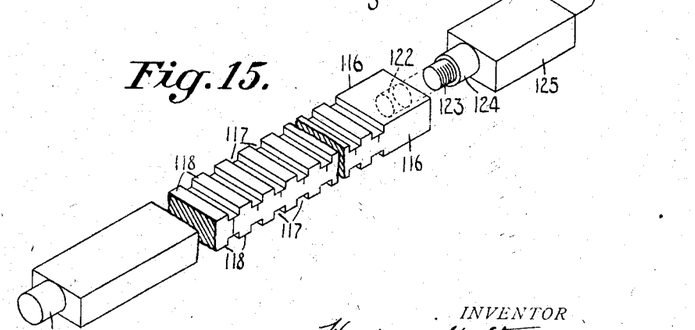
Fig. 15 is an enlarged fragmentary perspective view of the supporting rod or bar for the shifting member or members carried by the carriage.

The member 108 is adjustably mounted on a bar or rod 116 which is rectangular in cross section and is provided transversely of its top and bottom faces with a series of parallel notches or depressions 117, thereby forming sets of oppositely disposed teeth 118. The fingers 111 and 112 of the stop member 109 fit into the notches 117 between the teeth 118 in the bar 116, said bar being received in the openings 115 between the fingers. The distance between the rounded ends 114 of the fingers 111 and the upper faces of the opposite fingers 112 is slightly less than the thickness of the bar 116 (see Fig. 8) between the notches 117, so that in order to adjust the member 108 on the bar it is necessary to force the companion fingers 111 and 112 slightly apart, the fingers 111 yielding for this purpose and springing back to normal position when the rounded projections 114 pass out of engagement with the notches 117, thereby locking the member 108 in place. The distance from the center of one notch 117 to the next notch is preferably equal to one letter space distance and the back of the bar 116 is preferably provided with a scale, as shown in Figs. 6, 7 and 15, corresponding in its markings to the usual platen scale of the machine. The left-hand end of the bar 116 is reduced to form a cylindrical bearing portion 119 (Figs. 2 and 15) which is received in a bearing opening in a curved supporting arm 120 secured to the inner face of the left-hand side bar 17 of the carriage by headed screws 121 (Figs. 1 and 2). The right-hand end of the bar 116 is provided with a threaded opening 122 (Fig. 15) which receives the reduced threaded end 123 of a bearing stud 124 projecting laterally leftward from the end section 125. Projecting rightward from said end section is a stud 126 which receives a finger button 127 (Fig. 2), the latter being secured in place by a pin 128.

When the end section 125 is screwed in place in the bar 116, the stud 124 serves as a bearing for the right-hand portion of the bar 116, said stud 124 bearing in an opening 129 (Fig. 16) formed in the lower end portion of a supporting arm 130, said arm being secured to the inner face of the right-hand side bar 17 of the carriage by headed screws 131 which pass through openings 132 in the upper end portion of the arm 130 and enter tapped holes in the side bar 17. The lower end portion of the supporting arm 130 is provided with a lateral offset 133 extending inwardly and providing ledges or shoulders 134 upon which the bar 116 is adapted to rest and which serve normally to prevent the rotation of said bar 116 on its longitudinal axis. The construction is such that the bar is normally maintained in such position that the member or members 108 carried by said bar will properly coöperate with the two-part shifting member supported on the bracket 95, but by unscrewing the end piece 125 the right-hand end portion of the bar 116 may be lifted from the shoulders 134 and the bar may then be turned on its longitudinal axis until the stop member or members 108 are thrown back to inoperative position (as shown in Fig. 9), it being sometimes desirable to render the automatic ribbon shifting devices inoperative as will be better understood from what follows.

It will be understood, of course, that by means of the scale on the back of the bar 116 the member or members 108 may be adjusted relatively to the length of the carriage and so as to become operative at any predetermined point or points in the travel thereof. The two-part member carried by the frame is normally substantially upright, as shown in Fig. 2, but during the movement of the carriage a letter space direction from left to right the stop member 108 will be brought into engagement with the working face 101 of the lever or part 98 of said two-part member and will swing the upper arm of said lever leftward. The lower arm or part 103 of said lever is at this time in engagement with the screw 94 so that no relative movement between the lever 98 and the lever 93 can take place, and in order that the upper arm of the lever 98 may yield to the member 108 the lever 93 must turn on its fulcrum screw 94. During this turning movement the upper part of the lever 98 serves in effect as the upper arm of the lever 93. The lower slotted arm of the lever 93 swings in the opposite direction about the fulcrum screw 94 and being in engagement with the stud 91 on the slide rod 83 will slide said rod rightward on its bearings against the pressure of the spring 90. This sliding movement will continue until the tip of the upper arm of the lever 98 has been swung down to engage with the bottom face of the part 110 of the member 108 when rightward movement of the slide rod 83 will cease and said slide rod will remain motionless in the position shown in Fig. 5 while the end of the lever 98 rides over the bottom face of the part 110 and until the end of the lever passes out of contact with the part 110. During this riding contact between the two stop members the parts will be in the positions illustrated in Fig. 6. From an inspection of this figure it will be apparent that the rightward movement of the slide rod 83 against the influence of the spring 90 operates through the arms 79 on the member 72 and slides said member rightward, moving the stop face 73 out of operative position and bringing the stop face 74 into operative position, thereby automatically varying the throw of the ribbon vibrator and changing the operative field of the ribbon. As soon as the shifting members disengage, the slide rod and connected parts will be restored from the position shown in Fig. 5 to that shown in Fig. 2 by the operation of the spring 90, thereby bringing about a reshifting of the ribbon fields. The carriage may be moved manually from left to right by operating the usual release key, thereby causing the two shifting members to coöperate as above described, and said carriage may then be restored to begin a new line in the usual manner; or said carriage may, of course, be moved to effect a coöperation between the shifting members by the usual letter spacing operations. In the present case, however, I prefer to employ tabulating devices to cause movements of the carriage when it is desired to shift the ribbon automatically from one field to another, for the reason that such automatic shifting is preferably used in statement, manifest or other tabulating work and work of this character is facilitated by the use of tabulating mechanism.

The tabulating mechanism shown in the present instance is substantially the same as that employed in the Monarch typewriting machine and shown in the patent to Carl Gabrielson, No. 784,317, dated March 7, 1905. Said mechanism comprises a stop arm 135 (Fig. 1) which is secured at the back of the rear carriage bar 18 and extends horizontally therefrom. Coöperative with the stop 135 are one or more column stops 136, said stops being adjustable longitudinally of a toothed stop bar 137 journaled in arms 138 extending rearwardly from the standards 21. A crank arm 139 extends horizontally and forwardly from the right hand portion of the column stop bar 137, said arm 139 being connected by a link 140 (Figs. 1 and 2) with a sub-lever 141, said sub-lever being pivoted on a shouldered screw 142 which is secured in a lug 143 projecting inward from the right hand side of the base 1. The sub-lever is formed with an upward extension 144 having a slot 145, said slot receiving a pin or stud 146 extending laterally from a tabulating key lever 147, said key lever being fulcrumed on the fulcrum plate 5 and being provided at its forward end with a key button 148. It will be understood that when the tabulating key 148 is depressed it operates through the sub-lever 141 to draw the link 140 downwardly, said link, through the crank arm 139, effecting a turning movement of the stop bar 137 in its bearings, thereby turning the column stops 136 forwardly into position to arrest the carriage stop 135 when the carriage is released, said column stops 136 being normally in inoperative position out of the path of the carriage stop, as shown in Fig. 1.

In order to effect the release of the carriage when the tabulating key is operated an arm 149 is adjustably secured to the link 140 in position to engage, when the link is drawn downward, with the right hand arm of a release lever 150, said lever being fulcrumed at 151 on a bracket 152 depending from the under side of the top plate. The inner or left hand arm of the release lever 150 is connected at 153 with a release arm or lifting member 154, said member extending upward through an opening 155 in the top plate and being bifurcated at its upper end, the arms 156 of the bifurcated portion being disposed at the sides of the shaft 25ᵃ and being guided on said shaft. The arms 156 are bent horizontally forward at their upper ends to provide lifting shoes 157, said lifting shoes normally lying beneath and out of contact with the carriage feed rack 24. It will be understood that when the tabulating key is operated the lever 150 will have its right hand arm depressed and its left-hand arm raised, thereby moving the lifting member 154 upwardly and causing the lifting shoes 157 to engage the rack 24 and swing said rack upwardly about its pivot 22 to effect a disengagement between it and the feed pinion 25, thereby releasing the carriage.

The mode of operation of my invention as thus far described may be briefly explained. The present form of the invention may be employed generally wherever it is advantageous or desirable to write alternate columns in different colors to render conspicuous certain items or entries at stated intervals. In the drawings three shifting or contact members 108 are shown mounted on the bar or rod 116 at different points in the length of the carriage, the right-hand member 108 being considerably longer than the other two members. It is to be understood, of course, that the number and arrangement of the members 108 will vary with the character of work to be done and further that the length of said members 108 will be varied with the width of the columns to be written. The lengths of the members 108 determine how long a time in the travel of the carriage or what proportion of the whole extent of carriage movement particular ribbon fields will remain operative. Obviously, by providing a member 108 as long as the work sheet is wide, an entire line or a succession of lines may be written in one color. However I prefer to effect such a result by other means to be described presently. The position of the member or members 108 on the bar 116 will usually bear a certain relation to the location of the corresponding column stop or stops 136 and preferably the members 108 are arranged to enter into coöperation with the other shifting member on the frame at least two letter spaces before the carriage stop 135 coöperates with the column stop 136 to arrest the carriage after the release of the latter, said two letter spaces representing a margin of safety for insuring the automatic shifting of the ribbon prior to the beginning of writing in the column in which the change of ribbon field is to go into effect. It is to be understood, of course, that other column stops 136 may be employed besides those which correspond with the shifting members 108, said other column stops serving to define the columns which are to be written in black. The black columns may alternate with the red columns as in the character of work now being considered, but of course the arrangement of the columns will depend on the style of the work. This feature will be referred to at length a little later.

The column stops 136 and the adjustable shifting members 108 having been properly arranged, the work sheet is next entered in the machine and fed around with the platen in the usual manner until the proper position is reached for writing the first line of tabulated matter. The first item or portion of the first line may then be written by operating the appropriate key levers in the usual manner, causing the carriage to move step-by-step in letter space direction. At this time parts of the shifting devices mounted on the frame will be in the positions illustrated in Fig. 2. It will be apparent that at printing operation the ribbon vibrator 51 and its actuating devices, comprising the operating lever 58 and the link 69, will be moved from the positions shown in Fig. 11 to those shown in Fig. 12, thereby throwing the ribbon from the normal position illustrated in Fig. 11 upward until the field a or the black field covers the printing point and is interposed in the path of the types on the actuated type bars.

From an inspection of Fig. 12 it will be apparent that the upward throw of the ribbon is positively arrested by the engagement of the stop 64 on the operating lever 58 with the stopping portion 73 of the stop member 72. It will furthermore be apparent that after the stoppage or arrest of the operating lever 58, further downward movement of the universal bar and the link 69 will be permitted by the spring connection 67 between said link and said operating lever. Assuming that the initial portion of the first line has been written the tabulating key 148 may be operated, swinging the column stops 136 into operative position and lifting the rack 24 to free the carriage from the step-by-step feeding mechanism. Thereupon the main spring will operate to draw the carriage rapidly leftward across the top plate until the tabulator stop 135 on the carriage coöperates with the proximate column stop 136. Two letter space distances prior to the coöperation between the carriage stop 135 and the proximate column stop the proximate shifting member 108 on the carriage will engage with the two-part shifting member on the frame and will swing the latter from the position shown in Figs. 2 and 6 to that shown in Fig. 5. As has been already explained this operates to move the stop member 72 transversely of the operating lever 58 and renders the stopping portion 73 inoperative and the stopping portion 74 operative. The result will be that after the arrest of the carriage by the coöperating tabulating stops, subsequent depressions of the printing keys will operate to swing the ribbon operating lever 58 from the position shown in Fig. 11 to the position shown in Fig. 13 wherein it will be noted that the arrest of the operating lever is brought about by the coöperation between the stop 64 and the stopping portion 74 on the stop member 72. It will be apparent that at this stage the ribbon during printing operations will be thrown upwardly from the position shown in Fig. 11 to that shown in Fig. 13 to bring the lower or red stripe or field $b$ opposite the printing point and into the path of the types. It is to be noted that the greater extent of movement of the operating lever at this stage not only serves to impart a longer throw to the vibrator but also permits a greater downward movement of the link 69 before the lever 58 is arrested so that the flexure or bending of the spring 67 is less than when the stopping portion 73 of the member 72 was used.

From what has been said it will be apparent that the stopping portion 74 will remain operative and consequently the ribbon field $b$ or red field of the ribbon will be operative as long as the operative member 108, moving leftward step-by-step as the carriage is fed during printing operations, remains in contactive engagement with the upper arm of the lever 98. As soon, however, as the member 108 passes to the left of the tip end of the lever 98 the compressed spring 90 serves to restore the lever 98, the lever 93, the slide rod 83 and the stop member 72 to the first position illustrated in Fig. 2, thereby again rendering the stopping portion 73 operative. Consequently if the tabulating mechanism be operated to release the carriage and cause it to jump or run rapidly leftward until arrested in a predetermined columnar field which is at the left of the next member 108 on the bar 116, the writing in said predetermined columnar field will be in black. Or if without employing the tabulating mechanism, any writing be done before said next member 108 becomes operative, said writing will be in black. When, however, the tabulating mechanism is operated to bring said next member 108 into operative relation with the upper arm of the lever 98, the stop member 72 will be shifted in the manner heretobefore described to again render the lower or red field of the ribbon operative, so that the writing in the columnar field in part defined by that column stop 136 which corresponds with said next member 108 will be in red. The operations above outlined may be continued to the end of the line of writing and it will be obvious that the number and position of the columns written in red will depend upon the number and arrangement of the shifting members 108.

The end of the line having been reached, the usual line spacing devices may be operated and the carriage returned from left to right by hand in the usual manner to begin a new line of writing. During the return movement of the carriage the various members 108 will engage in turn with the rounded end portion 102 of the lever 98 and will operate to trip said lever, swinging it about its fulcrum 97 and moving it relatively to the lever 93 and stretching the spring 105. The position of the lever 98 while it is tripped or in coöperation with one of the members 108 is illustrated in Fig. 7 which, it will be recalled, is a rear view, and shows the bar or member 116 moving with the carriage in the direction of the arrow from right to left. From an inspection of said figure it will be observed that the lever 98 has yielded so as to permit the free and unobstructed movement of the member 108, the bar 116 and the carriage on which said bar is mounted, while at the same time the lever 93 on which said lever 98 is fulcrumed is not affected and conquently neither the slide rod 83 nor the stop member 72 is operated when the lever 98 is tripped by a movement of the carriage from left to right. As soon as the engaged member 108 has passed to the left (as viewed in Fig. 7) of the lever 98, the latter will return to the normal position shown in Fig. 6 and may thereafter be tripped by any following members 108 during the return movement of the carriage, said lever always returning, however, to the normal position after such tripping operations so that at the beginning of the new line of writing the working face 101 of said lever will be in position to coöperate with the members 108 during the tabulating movements of the carriage as previously explained.

From what has been said it will be seen that I provide a shifting member mounted on the frame of the machine and comprising two parts, viz., the lever 93 and the lever 98 and that said two-part member is adapted to coöperate with one or more members adjustable lengthwise of the carriage and supported thereon, the result of said coöperation being to automatically change or alter the throw of the vibrator so as to shift from one ribbon field to another. It will furthermore be seen that the ribbon mechanism will be automatically shifted so as to render a different ribbon field operative when one of the shifting members on the carriage coöperates with the two-part shifting member on the frame; that said different ribbon field will remain operative as long as said members remain engaged; that as soon as the two engaged members separate or disengage, the ribbon fields will be automatically shifted back so that the ribbon field which was operative in the first place will be again operative; that the operations above outlined will be repeated each time any following shifting members on the carriage coöperate with the two-part member on the frame; and that after the disengagement of the final member on the carriage with the member on the frame the ribbon shifting devices will be automatically restored to the first position so that the ribbon field first operative will again be ready for use. It will also be noted that during the return movement of the carriage to begin a new line of writing the shifting member or members on the carriage will coöperate with the two-part shifting member on the frame in such a way that one part of the latter will trip or yield so that the ribbon fields will not be altered or affected during return movements of the carriage, the consequence being that at the beginning of the new line the parts controlling the ribbon shift or change of field will be in the same relative positions that they were when the preceding line was begun.

It may sometimes be desirable to write an entire line or succession of lines in a single color, and preferably in order to accomplish this result I provide means for rendering the automatic ribbon field shifting devices inoperative and other means manually controlled for rendering one or another of the ribbon fields operative at will. To render the automatic shifting devices inoperative it is only necessary to unscrew the end section 125 of the bar or rod 116 and to lift the right hand end of said bar slightly and communicate a turning movement to the bar rearwardly in the direction of the arrow in Fig. 8 until the bar and the stop members 108 thereon have reached the position shown in Fig. 9. From an inspection of the latter figure it will be apparent that as the result of the turning movement, the members 108 have been shifted to positions where they will be inoperative on the lever 98 during the to and fro movements of the carriage and that as a consequence the automatic shifting mechanism will not be affected during said to and fro movements.

With the members 108 inoperative, as shown in Fig. 9, the stopping portion 73 of the member 72 will normally be maintained in operative position as shown in Fig. 2 by the spring 90 acting on said stop member 72 through the slide rod 83 and the arm 79 thereon and that consequently the upper or black field a of the ribbon will be operative. Whenever it is desired to make use of the red ribbon field, the stop member 72 may be manually shifted transversely of the operating lever 58 by means now to be described. As shown in Fig. 2 a rod or bar 158 is screwed or otherwise secured in the right-hand end of the slide rod 83, said rod 158 being of less diameter than the slide rod. The right-hand end portion of the rod 158 extends through an opening or slot 159 formed in the right-hand side plate 160 of the machine for the passage therethrough of the right-hand end portion of the ribbon driving shaft 47 (Figs. 2 and 4). Outside of the side plate 160 the end portion of the rod 158 has secured to it a knurled finger button 161. Normally or when the black field a of the ribbon is operative, the finger button 161 stands close to the side plate 160, as shown in full lines in Fig. 2. To the left of the side plate the rod 158 is provided with a circumferential groove 162 which is adapted to coöperate with a key hole slot 163 formed in a locking plate 164 which is slidably mounted on the inner face of the side plate 160. The locking plate 164 is provided with elongated slots 165 which receive small headed screws 166, said screws entering tapped holes in the side plate 160. The construction is such that the locking plate may be slid fore and aft of the machine on the shanks of the screws 166 to one position or another when the groove 162 is in register therewith and will be frictionally retained in adjusted position between the under side of the heads of said screws and the inner face of the side plate 160.

The forward end portion of the locking plate 164 is bent laterally rightward at right angles to the body of the locking plate to provide a handle or finger piece 167 by which said locking plate may be manipulated, said handle projecting through a cut-away or slot 168 formed in said side plate. Normally or when the black field of the ribbon is operative the rod 158 passes through the larger end of the key hole slot 163 as shown in Fig. 4, the dimensions of the larger end of said slot being such that the to and fro movements of the rod 158 when the automatic ribbon shifting devices are operated are not interfered with. When, as is now being considered, the automatic ribbon shifting devices are inoperative and it is desired to use the lower or red field of the ribbon, the finger button 161 is pulled to the right to the dotted line position (Fig. 2) to overcome the spring 90 and draw the slide rod 83 and the stop member 72 rightward until the stopping portion 74 of said stop member is in position to coöperate with the stop 64 on the operating lever 58. The rightward longitudinal movement of the rod 158 brings the circumferential groove 162 into the plane of the locking plate 164 so that the operator, still maintaining the finger button 161 in the dotted line position, may push the handle 167 of the locking plate rearwardly, causing the narrow end of the key hole slot 163 to coöperate with the groove 126. The width of the narrow end of the key hole slot 163 is slightly greater than the reduced part 162ª of the rod 158 within the groove 162, but the width of said narrow portion of the key hole slot is not so great as the diameter of the rod 158 outside the groove. Consequently the finger button 161 may now be released and the tendency of the spring 90 to restore the parts to the position shown in Fig. 2 will be prevented by the engagement of the right-hand wall of the groove 162 with the portions of the right-hand face of the locking plate 164 which are above and below the narrow end of the key hole slot 163. It will be apparent, therefore, that as long as the locking plate remains in its rearmost position the slide rod 83 will be locked so as to maintain the stopping portion 74 of the stop member 72 in operative position, and that the red field of the ribbon in consequence may be used to any desired extent. When it is desired to again use the black field the handle 167 may be pulled forward, permitting the spring 90 to restore the slide rod and the member 72 to the positions shown in Fig. 2. When it is again desired to make use of the automatic shifting mechanism the operator may turn back the bar 116 from the position shown in Fig. 9 to that shown in Fig. 8, care being taken of course that the locking plate 164 is in its forward position.

Figures 16, 17, 18:
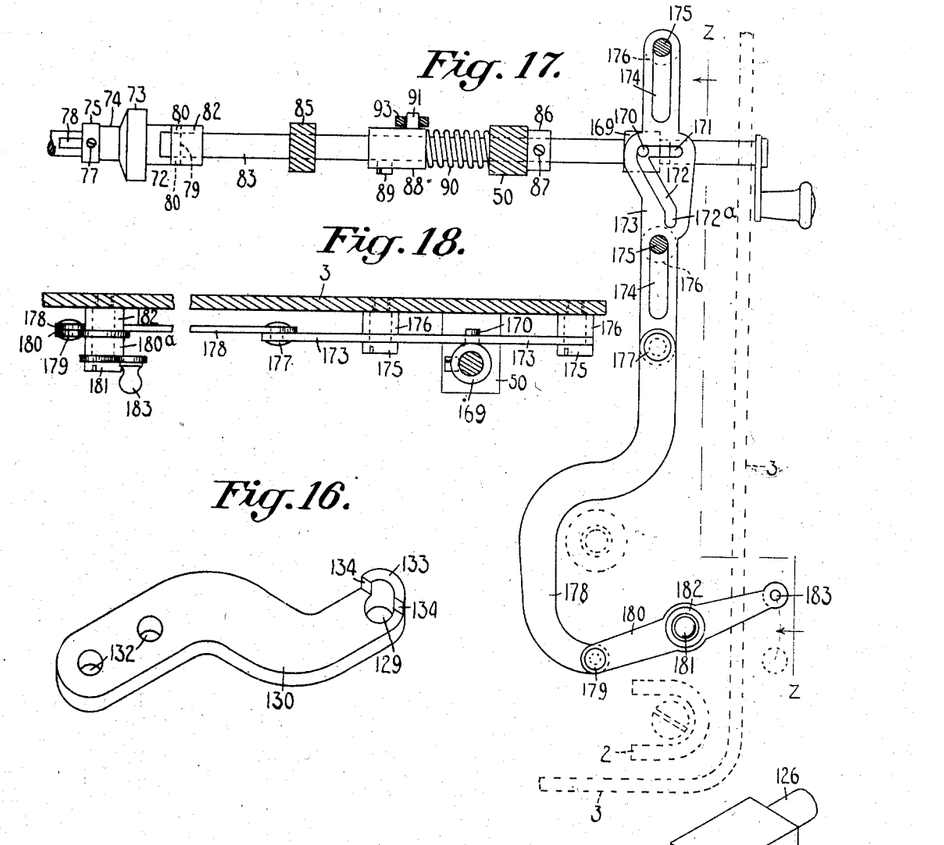
Fig. 16 is an enlarged perspective view of one of the supporting arms for the rod or bar shown in Fig. 15.
Fig. 17 is a horizontal sectional view, taken just beneath the top plate of the machine and showing a modified construction of the means for manually shifting the ribbon or altering the printing field thereof.
Fig. 18 is a fragmentary sectional view taken on the plane represented by the line z—z in Fig. 17 and looking in the direction of the arrows at said line.

A modified construction of manual shifting mechanism which may be employed in lieu of the grooved rod 158 and the locking plate 164 is illustrated in Figs. 17 and 18. In the modified construction a collar 169 is secured to the right-hand end portion of the slide rod 83, said collar carrying an upwardly extending pin or stud 170 which operates in slots 171 and 172 formed in a slidable plate 173, said plate being provided with guide slots 174 which receive headed guiding and supporting screws 175, said screws entering tapped holes in the under side of the top plate first passing through depending lugs or bosses 176 on said plate, or through spacing sleeves held in place by said screws. The screws 175 serve to maintain the slide plate 173 close against the bottom faces of the bosses 176 and guide and support the slide plate when it is moved fore and aft of the machine in a manner presently to be described. The slide plate 173 is pivotally connected by a double headed pin or loose rivet 177 with a curved link 178 which extends forwardly beneath the top plate and is connected by a loose rivet 179 with a lever 180, said lever being fulcrumed on a shouldered screw 181 which enters the underside of the top plate, passing through a boss or spacing sleeve 182 and serving to maintain the hub 180ª of the lever 180 close against said boss. The outer or free end of the lever 180 extends laterally beyond the side edge of the top plate of the machine and is provided with a handle or finger piece 183 by which it may be manipulated to shift the slide plate 173 fore and aft on its bearing screws 175.

From an inspection of Fig. 17 it will be noted that the slots 171 and 172 are angularly disposed to each other and are connected at their ends. During the normal automatic operation of the mechanism in the manner previously described the slide rod 83 will be longitudinally reciprocated and the pin or stud 170 thereon will be moved to and fro in the slot 171. When it is desired to dispense with the automatic ribbon shifting mechanism the bar 116 will be turned in the manner previously described to render the members 108 inoperative on the lever 98 as shown in Fig. 9. The handle 183 on the lever 180 may then be pulled forward, sliding the plate 173 rearwardly and causing the pin 170 to enter the slot 172, the edge of said slot serving to force said pin and with it the slide rod 83 rightwardly until the pin enters the forward end portion 172ª of the slot 172, when the stopping portion 74 of the stop member 72 will be rendered operative, said stop member, as has been previously explained, being controlled by the movement of the slide rod 83. When it is desired to dispense with the modified manual shifting mechanism and again operate the ribbon field changing devices automatically, the handle 183 may be pushed backwardly to the first position and the bar 116 turned over from the position shown in Fig. 9 to that shown in Fig. 8, and it will again bring the slot 171 into position to coöperate with the pin 170.

Certain features disclosed herein form the subject-matter of my application Serial No. 332,950, filed September 1st, 1906, the claims in the present case being directed to subject-matter not claimed either in said application or in my other application Serial No. 332,949.

Various changes may be effected within the scope of my present invention.

What I claim as new and desire to secure by Letters Patent, is:—

1. In a typewriting machine, the combination with a carriage and inking mechanism including inking surfaces of different characteristics, of means operative at a predetermined point in the travel of the carriage to change automatically from one inking surface to another, said means including two coöperative contact members, one of which may be variably set to determine its point of coöperation with the other member, the change in the inking surfaces commencing when contact between said members commences, and means for again effecting a change of inking surface as soon as contact between said members ceases.

2. In a typewriting machine, the combination with a traveling element or carriage, printing instrumentalities, a ribbon having fields of different characteristics, and means for feeding the ribbon longitudinally, of ribbon field-changing means including two shifting members, one constantly operatively connected with the carriage and one on a fixed part, said members coöperating during the movements of the carriage in both directions of its travel, the coöperation of said members during the travel of the carriage in one direction only operating to change the ribbon field exposed to the printing instrumentalities, the change remaining only so long as said members are in coöperation, and the construction being such that the ribbon field changes again automatically when the coöperation of said members ceases.

3. In a typewriting machine, the combination with a carriage, printing instrumentalities, a ribbon having fields of different characteristics, and means for feeding the ribbon longitudinally, of ribbon field-changing means including shifting members coöperative to change the ribbon field exposed to the action of the printing instrumentalities, the change remaining only so long as the shifting members are in coöperation, said shifting members being relatively adjustable to vary the point in the carriage travel at which the change of ribbon field occurs, and the construction being such that the ribbon field changes again automatically when the coöperation of said members ceases.

4. In a typewriting machine, the combination with a carriage, printing instrumentalities, a ribbon having fields of different characteristics, and means for feeding the ribbon longitudinally, of ribbon field-changing means including two shifting members, one on the carriage, said shifting members being coöperative to change the ribbon field exposed to the action of the printing instrumentalities, the change remaining only so long as the shifting members are in coöperation, the shifting member on the carriage being adjustable to vary the point at which the shifting of the ribbon takes place; and the construction being such that the ribbon field changes again automatically when the coöperation of said members ceases.

5. In a typewriting machine, the combination with a carriage, printing instrumentalities, a ribbon having fields of different characteristics, and a ribbon vibrator, of means for varying the extent of movement of said vibrator to change from one ribbon field to another said means comprising shifting members, one member constantly operatively connected with the carriage and one member on a fixed part, said members coöperating automatically at a predetermined point in the carriage travel, the ribbon field being and remaining changed only so long as said members remain in coöperation; and the construction being such that the ribbon field changes again automatically when the coöperation of said members ceases.

6. In a typewriting machine, the combination with a carriage, printing instrumentalities, a ribbon having fields of different characteristics, and a ribbon vibrator, of means for varying the extent of movement of said vibrator to change from one ribbon field to another, said means comprising a stop member, shifting members one constantly operatively connected with the carriage and one on a fixed part, said members coöperating automatically at a predetermined point in the carriage travel to actuate said stop member, the ribbon field remaining changed only so long as said shifting members remain in coöperation, and the construction being such that the ribbon field changes again automatically when the coöperation of said members ceases; and means for varying the point at which said shifting members coöperate.

7. In a typewriting machine, the combination of a carriage; a ribbon vibrator; means for actuating the same; types; and means for changing the character of the ribbon exposed to the types, said means including a stop member adjustable to effect a positive stoppage of said vibrator at different points in its movement towards the printing point and shifting members, one constantly operatively connected with the carriage and one on a fixed part, said shifting members coöperating to shift said stop member, said stop member remaining shifted only so long as said members remain in coöperative engagement, and the construction being such that said stop member returns to normal position automatically when the coöperation of said shifting members ceases.

8. In a typewriting machine, the combination of a carriage; a ribbon vibrator; means for actuating the same; types; and means for changing the character of the ribbon exposed to the types, said means including a stop member adjustable to effect a positive stoppage of said vibrator at different points in its movement towards the printing point, and shifting members, one operatively connected with the carriage and one on a fixed part, said members coöperating to shift said stop member, said stop member remaining shifted only so long as said members remain in coöperative engagement, one of said members being adjustable relatively to the other to vary the point in the carriage travel at which the coöperative engagement of said members begins.

9. In a typewriting machine, the combination of a carriage; a ribbon vibrator; means for actuating said vibrator, said means comprising an operating lever; and means for changing the printing field of the ribbon exposed to the action of the types, said means comprising a stop member adjustable transversely of said operating lever and having a plurality of stopping portions coöperative with said lever to arrest the same at varying points, lever pivoted on a fixed part and operative to move said stop member, and a shifting member on the carriage operative to alter the position of said lever and the construction being such that said lever returns to its original position after said shifting member passes out of engagement with it.

10. In a typewriting machine, the combination of a ribbon vibrator; actuating means therefor including an operating lever; a stop member having a plurality of stopping portions coöperative with said operating lever, said stop member being normally spring-controlled; and shifting members, one on a fixed part and one constantly operatively connected with the carriage, said members coöperating to shift said stop member, said stop member remaining shifted as long as said members remain in coöperative engagement and thereafter returning to its first or normal position.

11. In a typewriting machine, the combination of a ribbon vibrator; actuating means therefor including an operating lever; a stop member having a plurality of stopping portions coöperative with said operating lever, said stop member being normally spring-controlled; shifting members, one on a fixed part and one constantly operatively connected with the carriage, said shifting members coöperating to shift said stop member, said stop member remaining shifted as long as said shifting members remain in coöperative engagement and thereafter returning to its first or normal position; and means for manually actuating said stop members.

12. In a typewriting machine, the combination of a ribbon vibrator; actuating means therefor including an operating lever; a stop member having a plurality of stopping portions coöperative with said operating lever, said stop member being normally spring-controlled; shifting members, one on a fixed part and one constantly operatively connected with the carriage, said shifting members coöperating to shift said stop member, said stop member remaining shifted as long as said members remain in coöperative engagement and thereafter returning to its first or normal position; means for rendering said shifting members inoperative one upon the other; and means for manually actuating said stop member.

13. In a typewriting machine, the combination of a ribbon vibrator; actuating means therefor including an operating lever; a stop member having a plurality of stopping portions coöperative with said operating lever, said stop member being normally spring-controlled; shifting members, one on a fixed part and one constantly operatively connected with the carriage, said members coöperating to shift said stop member, said stop member remaining shifted as long as said members remain in coöperative engagement and thereafter returning to its first or normal position; and means for manually actuating said stop member, said manual means comprising a shiftable cam plate, a lever provided with a finger piece or handle, and a link connecting said lever with said cam plate.

14. In a typewriting machine, the combination with a carriage, printing instrumentalities, a ribbon having fields of different characteristics, and means for feeding the ribbon longitudinally, of means for changing the ribbon field exposed to the action of the printing instrumentalities, said last named means comprising coöperative shifting members, one on the carriage and one on the frame, the ribbon fields remaining changed only so long as said members are in coöperation; and means for rendering said members inoperative one on the other.

15. In a typewriting machine, the combination with a traveling element or carriage, printing instrumentalities, a ribbon having fields of different characteristics, and means for feeding the ribbon longitudinally, of means for changing the ribbon fields comprising shifting members, one constantly operatively connected with the carriage and one on a fixed part, said members coöperating during the movements of the carriage in both directions of its travel, the coöperation of said members during the travel of the carriage in one direction only operating to change the ribbon field exposed to the printing instrumentalities, the ribbon field remaining changed only so long as said members are in engagement and the construction being such that the ribbon field changes again automatically when the coöperation of said members ceases; and means for rendering said members inoperative one upon the other.

16. In a typewriting machine, the combination with a carriage, printing instrumentalities, a ribbon having fields of different characteristics, and means for feeding the ribbon longitudinally, of means for changing the ribbon field exposed to the action of the printing instrumentalities, said last named means comprising coöperative shifting members, the ribbon field remaining changed only so long as the shifting members are in coöperation and the construction being such that the ribbon field changes again automatically when the coöperation of said members ceases, said shifting members being relatively adjustable to vary the point in the carriage travel at which the change occurs; and means for rendering said members inoperative one upon the other.

17. In a typewriting machine, the combination with a carriage, printing instrumentalities, a ribbon having fields of different characteristics, and a ribbon vibrator, of means for varying the extent of movement of said vibrator to change from one ribbon field to another, said means comprising shifting members, one constantly operatively connected with the carriage and one on a fixed part, said members coöperating automatically at a predetermined point in the carriage travel to actuate said means, the ribbon field remaining changed only so long as said members remain in coöperation; and the construction being such that the ribbon field changes again automatically when the coöperation of said members ceases; and means for rendering said members inoperative one upon the other to actuate said means.

18. In a typewriting machine, the combination of a ribbon vibrator; an operating lever having one arm connected with said vibrator; a key actuated universal bar; an actuating link yieldingly connecting said universal bar with the other arm of said operating lever; a stop member having a plurality of stopping portions adapted to engage said lever to limit its movements; and means for automatically shifting said stop member, said means comprising engageable shifting members, said stop member remaining shifted only so long as said members remain in engagement, the shifting movement of the stop member beginning when engagement between said shifting members begins.

19. In a typewriting machine, the combination of a carriage; a ribbon having fields of different characteristics; and ribbon field-changing mechanism, said mechanism including a contact device the size whereof determines the length of time one or another of the ribbon fields will be operative.

20. In a typewriting machine, the combination of a carriage; a ribbon having fields of different characteristics; and ribbon field-changing mechanism, said mechanism including contact members varying in size, the size of said members regulating the length of time certain of the ribbon fields will be operative.

21. In a typewriting machine, the combination of a carriage; a ribbon having fields of different characteristics; and ribbon field-changing mechanism, said mechanism including contact members varying in length, the length of said contact members determining the extent or amount of the travel of the carriage during which certain of the ribbon fields will be operative.

22. In a typewriting machine, the combination of a carriage; a ribbon having fields of different characteristics; and ribbon field-changing mechanism, said mechanism including contact members varying in length, the length of said contact members determining the extent or amount of the travel of the carriage during which certain of the ribbon fields will be operative and the position of said members determining the points in the course of the carriage travel at which the use of certain of said ribbon fields may begin.

23. In a typewriting machine, the combination of a tabulating mechanism; a ribbon having fields of different characteristics; and means for printing with one field of the ribbon in one columnar field and for automatically shifting to print with another field of the ribbon in another columnar field, said means including a contact member, the length whereof corresponds with the width of certain of said columnar fields.

24. In a typewriting machine, the combination of a tabulating mechanism; a ribbon having fields of different colors; and automatically actuated ribbon controlling means for printing with one color in one columnar field and with another color in another columnar field; said means including engageable shifting members, one on the carriage of the machine, and the use of certain of said colors depending on whether or not said ribbon shifting members are in engagement.

25. In a typewriting machine, the combination with a carriage, step-by-step feeding mechanism therefor, types, a ribbon having fields of different characteristics, ribbon feeding mechanism, and tabulating mechanism operative to arrest the carriage when released from its step-by-step feeding mechanism in predetermined columnar positions, of ribbon field changing means comprising shifting members one on the carriage of the machine, said members being operative during the movement of the carriage to a predetermined columnar position to change the ribbon field exposed to the action of the types, the ribbon field remaining changed only so long as said members remain in engagement and the construction being such that the ribbon field changes again automatically when the coöperation of said members ceases, the change of ribbon fields beginning when engagement between said members begins.

26. In a typewriting machine, the combination with a carriage, step-by-step feeding mechanism therefor, types, a ribbon having fields of different characteristics, a ribbon vibrator, a ribbon feeding mechanism and tabulating mechanism including stops operative to arrest the carriage when released from its step-by-step feeding mechanism to predetermined columnar positions, of means operative during the movement of the carriage to a predetermined columnar position to vary the throw of the vibrator and thereby change the working field of the ribbon, said means including engageable shifting members and the working field of the ribbon remaining so changed only so long as said members remain in engagement and the construction being such that the ribbon field changes again automatically when the coöperation of said members ceases, said members being relatively adjustable to vary the change of field at will.

27. In a typewriting machine, the combination with a carriage, step-by-step feeding mechanism therefor, types, a ribbon having fields of different characteristics, a ribbon vibrator, actuating devices for the vibrator, ribbon feeding mechanism, and tabulating mechanism including stops operative to arrest the carriage when released from its step-by-step feed mechanism in predetermined columnar positions, of a stop member having a plurality of stopping portions coöperative with certain of said vibrator actuating devices to arrest the same at different points; and ribbon field changing devices including a shifting member constantly connected with the carriage and a shifting member on the frame, said shifting members being coöperative during the movement of the carriage to a predetermined columnar position to effect a shift or readjustment of said stop member, the latter remaining shifted only so long as said shifting members are in coöperative engagement and the construction being such that the ribbon field changes again automatically when the coöperation of said members ceases.

28. In a typewriting machine, the combination of a carriage; printing instrumentalities; a ribbon having fields of different characteristics; means for feeding the ribbon longitudinally; and means operating automatically at a predetermined point in the carriage travel to shift or change the ribbon field coöperative with the printing instrumentalities, said means being capable of so operating during the travel of the carriage in one direction only.

29. In a typewriting machine, the combination of a carriage; printing instrumentalities; a ribbon having fields of different characteristics; means for feeding the ribbon longitudinally; shifting members, one constantly operatively connected with the carriage and one on a fixed part, said members coöperating at a predetermined point in the carriage travel in one direction to change the ribbon field coöperative with the printing instrumentalities, said members being inoperative to effect a change of ribbon fields during the travel of the carriage in the opposite direction.

30. In a typewriting machine, the combination of a carriage, printing instrumentalities; a ribbon having fields of different characteristics; means for feeding the ribbon longitudinally; shifting members, one constantly operatively connected with the carriage and one on a fixed part, said members coöperating at a predetermined point in the carriage travel in one direction to change the ribbon field coöperative with the printing instrumentalities and being relatively adjustable to vary the point at which the change or shift in the ribbon fields takes place, said members being inoperative to effect a change of ribbon fields during the travel of the carriage in the opposite direction.

31. In a typewriting machine, the combination with a carriage, printing instrumentalities, a ribbon having fields of different characteristics, and a ribbon vibrator, of means for varying the extent of movement of said vibrator to change from one ribbon field to another; and shifting members coöperating automatically to actuate said means at a predetermined point in the carriage travel in one direction, said members being inoperative to actuate said means during the return travel of the carriage.

32. In a typewriting machine, the combination with a traveling element or carriage, printing instrumentalities, a ribbon having fields of different characteristics, and means for feeding the ribbon longitudinally, of means operating automatically to change the ribbon field coöperative with the printing instrumentalities, said means including a toothed bar on the carriage, a contact member adjustably mounted on said bar; and a second member coöperative with the first, said second member comprising a lever pivoted on a fixed part and a second lever pivoted on the first lever.

33. In a typewriting machine, the combination of a carriage; a ribbon having fields of different characteristics; a ribbon vibrator;

actuating devices therefor; a stop member having a plurality of stopping portions coöperative with certain of said vibrator actuating devices, one or more contact members mounted on the carriage; a coöperative member mounted on the frame of the machine and comprising two levers, one pivoted on the other and normally spring-controlled, said members coöperating during the travel of the carriage in one direction to effect a shift or re-adjustment of said stop member and being inoperative on said stop member during the travel of the carriage in the opposite direction.

34. In a typewriting machine, the combination of a carriage; a ribbon having fields of different characteristics; a ribbon vibrator; actuating devices therefor; a stop device having a plurality of stopping portions coöperative with certain of said vibrator actuating devices, said stop device being normally spring-controlled; one or more contact members mounted on the carriage; a coöperative member mounted on the frame and comprising two levers, one pivoted on the other; connections between said coöperative member and said stop device, said members coöperating to shift or re-adjust said stop device during the travel of the carriage in one direction; and a spring for restoring said stop device automatically to its first position when said ribbon shifting members disengage, said ribbon shifting members being inoperative to move said stop device during the travel of the carriage in the opposite direction.

35. In a typewriting machine, the combination with a carriage, types and inking means having inking surfaces of different characteristics, of shifting members, one continuously connected with the carriage and one on a fixed part, one of said members being elongated and one of said members shifting the other and holding it in shifted position during a predetermined part of the carriage travel depending on the length of the elongated member; and means controlled by said shifting members for changing the inking surface exposed to the action of the types.

36. In a typewriting machine, the combination with a carriage, types and inking means having inking surfaces of different characteristics, of an elongated device arranged to move with the carriage, and means controlled by said device for changing the inking surface to be exposed to the action of the types, the part of the carriage travel during which the change continues depending on the length of said device.

37. In a typewriting machine, the combination with a carriage, types and inking means having inking surfaces of different characteristics, of an elongated device arranged to move with the carriage, and means controlled by said device for changing the inking surface to be exposed to the action of the types, the part of the carriage travel during which the change continues depending on the length of said device, said device being adjustable to vary the point in the line of writing at which the change occurs.

Signed at Syracuse, in the county of Onondaga, and State of New York, this 30th day of August A. D. 1906.

HERBERT H. STEELE.

Witnesses:
JOHN S. MITCHELL,
W. J. LOGAN.